United States Patent
Chang

(10) Patent No.: US 8,373,807 B2
(45) Date of Patent: Feb. 12, 2013

(54) DATA PRODUCING METHOD AND ELECTRONIC DEVICE THEREOF

(75) Inventor: Yao-Tsung Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 266 days.

(21) Appl. No.: 12/662,790

(22) Filed: May 4, 2010

(65) Prior Publication Data

US 2011/0141127 A1    Jun. 16, 2011

(30) Foreign Application Priority Data

Dec. 15, 2009    (TW) .............................. 98142891 A

(51) Int. Cl.
*G02F 1/1335* (2006.01)
(52) U.S. Cl. ........................................................ 349/15
(58) Field of Classification Search ...................... 349/15
See application file for complete search history.

(56) References Cited

U.S. PATENT DOCUMENTS

| | | | | |
|---|---|---|---|---|
| 2009/0040401 A1* | 2/2009 | Tamura et al. | .................. | 349/15 |
| 2009/0103178 A1* | 4/2009 | Woodgate et al. | ............ | 359/465 |
| 2009/0141201 A1* | 6/2009 | Yeh et al. | ........................ | 349/15 |
| 2010/0066927 A1* | 3/2010 | Chang | ............................ | 349/15 |
| 2010/0091226 A1* | 4/2010 | Takatani et al. | ............... | 349/110 |

\* cited by examiner

*Primary Examiner* — Sung Pak
(74) *Attorney, Agent, or Firm* — Bacon & Thomas, PLLC

(57) ABSTRACT

A data producing method and an electronic device thereof is disclosed. The electronic device comprises a storage module, a display module, and a control module. The storage module is capable of storing first data. The display module forms a first display area and a second display area. The data displayed on the first display area and the second display area have different optical characteristics. The control module is electrically connected to the storage module and the display module. The control module produces second data. The control module drives the first display area to display the first data and drives the second display area to display the second data. The first data and the second data are simultaneously displayed by the display module.

10 Claims, 10 Drawing Sheets

DATA PRODUCING METHOD AND ELECTRONIC DEVICE THEREOF

BACKGROUND OF THE INVENTION

1. Field of the Invention

The present invention relates to a data producing method and an electronic device thereof; and more particularly, to a data producing method and an electronic device thereof which allows different data to be displayed on a same screen.

2. Description of the Related Art

Generally, people use portable electronic devices, such as portable computers, PDAs and cell phones to process data or produce documents. In some cases, the data requires confidentiality and some type of encryption or protection is needed to prevent data leakage. Moreover, the data that is displayed on a screen in a public place could be viewable by an unauthorized person. Therefore, the importance of incorporating anti-snooping measures onto a displaying screen should not be underestimated.

In the prior art, an anti-snooping sticker is usually affixed onto a display screen, and the see-through property of the anti-snooping sticker limits the viewable scope on the display screen in order to reduce the possibility of data leakage; furthermore, the prior art also provides a method which controls the liquid crystals to shield away the backlight in order to cover unnecessary image areas, leaving only visible images within a specific viewing range. However, the anti-snooping effect of the above methods is limited and data can still be easily leaked.

SUMMARY OF THE INVENTION

The object of the present invention is to provide an electronic device which allows different data to be displayed on a same screen.

To achieve the above objective, the electronic device of the present invention comprises a storage module, a display module, and a control module. The storage module is capable of storing first data. The display module forms a first display area and a second display area. The data displayed on the first and the second display areas have different optical characteristics. The control module for producing second data is electrically connected to the storage module and the display module. The control module drives the first display area to display the first data and drives the second display area to display the second data. The first data and the second data are simultaneously displayed by the display module. Accordingly, by mixing the first data and the second data on the same screen whereby the first data and the second data have different optical characteristics, different users may observe different data form the same screen. Furthermore, the design of this electronic device prevents unauthorized users to distinguish between the first data and the second data, thus ensures the anti-snooping effect and achieves data security.

In another embodiment of this electronic device, the display module comprises a liquid crystal layer, a first polarizer, a second polarizer and a liquid crystal control layer. The liquid crystal layer is disposed between the first polarizer and the second polarizer. The polarization effect of the-second polarizer and the first polarizer is substantially deviated by 90 degrees. The liquid crystal control layer is mounted on the second polarizer. The liquid crystal control layer may create different polarization effects by changing the structure of the liquid crystal via different input voltages. The control module for producing second data is electrically connected to the storage module and the display module. The control module periodically displays the first data and the second data on the display module in an alternating manner. While the first data and the second data are displayed, the control module provides the liquid crystal control layer with different voltages, so that the first data and the second data have different polarization characteristics.

The data producing method of the present invention is applied to the abovementioned electronic devices, the method comprises the following steps: obtaining first data; producing second data; displaying the first data on the first display area of the display module, wherein the first data displayed by the first display area has a first optical characteristic; and displaying the second data on the second display area of the display module, wherein the second data displayed by the second display area has a second optical characteristic, and the first and the second optical characteristics are different from each other.

The viewing device of this invention is applied to the abovementioned electronic devices. The viewing device comprises a lens module, the lens module comprises an optical structure which corresponds to the optical characteristic produced by the first display area, so as to allow the first data to pass through the lens and block off the second data. Therefore, a user may only see the first data by wearing the viewing device.

In another embodiment of the viewing device, the viewing device comprises at least one shutter device, the shutter devices is used to periodically display the first data or the second data. Wearing the viewing device enables the user to see either the first data or the second data, to prevent confusion.

DETAILED DESCRIPTION OF THE PREFERRED EMBODIMENT

The advantages and innovative features of the invention will become more apparent from the following detailed description when taken in conjunction with the accompanying drawings.

Figure 1:
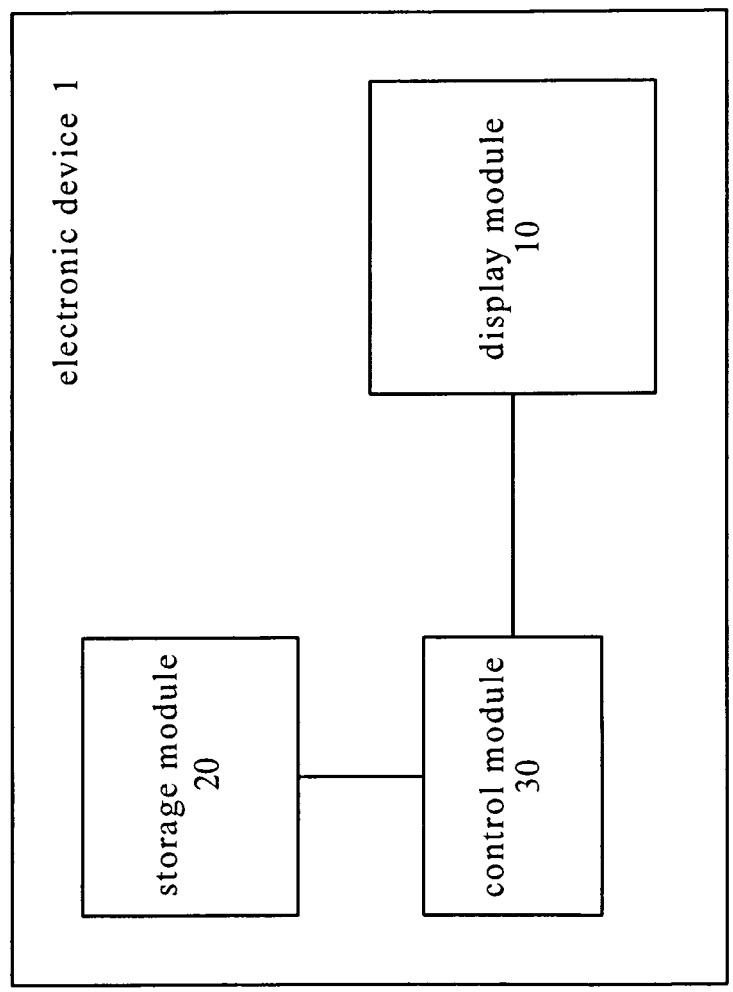
FIG. 1 illustrates a system block diagram for the electronic device of the present invention.

Refer to FIG. 1 for a system block diagram for an electronic device of the present invention. The electronic devices of the present invention may be a display device (such as a computer screen or a TV) or an integrated device comprising a display (such as computer systems, notebook computers, mobile phones or PDAs), but the present invention is not only limit to these devices.

As shown in FIG. 1, the electronic device 1 of the present invention comprises a storage module 20, a display module 10 and a control module 30. The storage module 20 is used for storing first data, the first data may be text or image data. The display module 10 may be used to form a first display area and a second display area. The structure of the display module 10 causes the first display area and the second display area to have different optical structures; therefore, the data shown by the first display area and the second display have different optical characteristics. The control module 30 is electrically connected to the storage module 20 and the display module 10. The control module 30 is used to produce second data, and the second data may be different from the aforementioned first data. The second data may be text, image or interfering data, wherein the interfering data is used to interfere with the viewing of the first data. The control module 30 obtains the first data from the storage module 20. Then the control module 30 drives the first display area of the display module 10 to display the first data, and drives the second display area of the display module 10 to display the second data, wherein display module 10 is used to display the first data and the second data simultaneously.

The design of the present invention is able to mix the first data and the second data by displaying both data on the same screen, while the first data and the second data have different optical characteristics. The user only requires the wearing of a supporting device which corresponds to the optical characteristics of the first data or the second data in order to screen out the unnecessary data and be able to view only the required data on the electronic device 1. In addition, the second data may be an interfering image. The surrounding observers may only see the combination image of the first data and the second data, making the first data unidentifiable, thus achieving the anti-snooping effect to ensure data security. The subsequent sections will illustrate the designs and applications of the electronic device 1 of the present invention by means of various embodiments.

Figure 2:
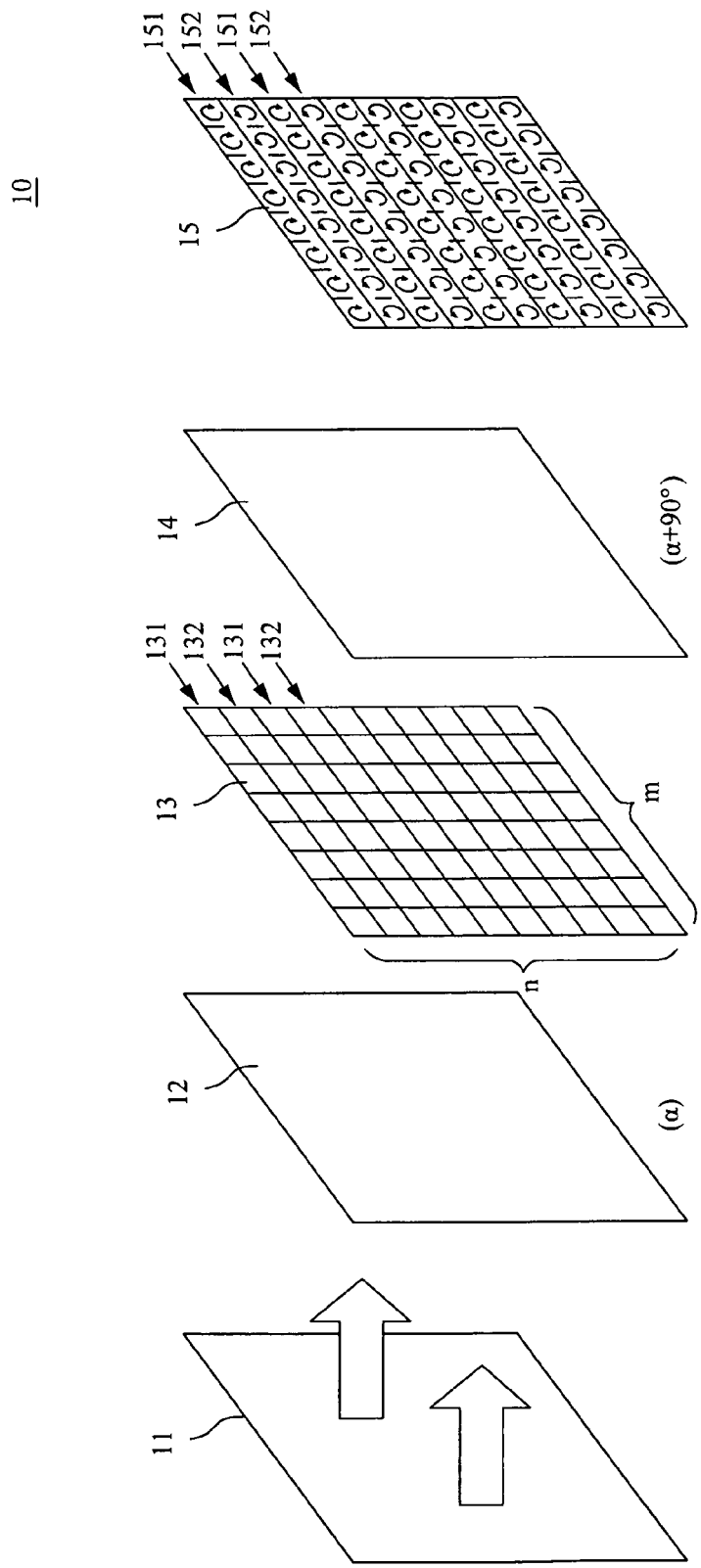
FIG. 2 illustrates a structural diagram of a display module of the electronic device in a first embodiment of the present invention.

Refer to FIG. 2 for a structural diagram of a display module 10 of the electronic device in a first embodiment of the present invention. As shown in FIG. 2, the display module 10 comprises a backlight 11, a first polarizer 12, a liquid crystal layer 13 and a second polarizer 14. The first polarizer 12, the liquid crystal layer 13 and the second polarizer 14 are sequentially stacked on the backlight 11 (i.e. the liquid crystal layer 13 is disposed between the first polarizer 12 and the second polarizer 14), and the polarization effect of the second polarizer 14 and the first polarizer 12 is substantially deviated by 90 degrees. With the aforementioned configuration, the light from the backlight 11 first passes through the first polarizer 12 to form a light with a polarizing angle (assumed to be $\alpha$), and then passes through the liquid crystal layer 13. The liquid crystal layer 13 controls the molecular structure of the liquid crystal with different voltages, so that the polarizing angle ($\alpha$) of the light may be changed after the light passes through the liquid crystal layer 13. The polarizing angle ($\alpha$) of the light is increased by 0~90 degrees depending on the corresponding image brightness of each liquid crystal molecules (i.e. the polarization angle of the light lies between $\alpha$~$\alpha$+90 degrees). The structure of the second polarizer 14 may allow the light with the polarizing angle ($\alpha$) adding an additional 90 degrees (ie, $\alpha$+90 degrees) to pass through. Therefore, by differences of the polarizing angle of the light passes through liquid crystal layer 13, the light may pass or be blocked by the second polarizer 14 to form bright or dark dots. This is a known principle in the profession of liquid crystal display and it will not be discussed in detail.

In this embodiment, the liquid crystal layer 13 comprises m×n pixels consisting of m columns and n rows of pixels, and the pixels are divided into two regions corresponding to the first display area and the second display area respectively. The first display area corresponds to the odd rows of the pixels 131 of the liquid crystal layer 13. The second display area corresponds to the even rows of the pixels 132 of the liquid crystal layer 13.

As shown in FIG. 1 and FIG. 2, the control module 30 drives the display module 10 to display the first data through the odd rows of the pixels 131 and to display the second data through the even rows of the pixels 132, thus enabling the display module 10 to display the first data and the second data simultaneously on the same screen. Also, the first display area may be designed to correspond to the even rows of the pixels 132 of the liquid crystal layer 13, and the second display area may be designed to correspond to the odd rows of the pixels 131, or interchanging the rows of the pixels corresponding to each display area, but the present invention is not limited to the above configuration.

In this embodiment, the display module 10 further comprises an optical rotation plate 15, which is used to form a light with rotational characteristics. Regions of the optical rotation plate 15 respectively corresponding to the first display area and the second display area form optical rotation structures with different optical rotational characteristics, wherein the optical rotation characteristic is dextrorotary or levorotary. For example, the regions where the optical rotation plate 15 corresponding to the odd rows of the pixels 131 of the liquid crystal layer 13 forms a first optical rotation structure 151 with dextrorotary. The regions where the optical rotation plate 15 corresponding to the even rows of the pixels 132 of the liquid crystal layer 13 forms a second optical rotation structure 152 with levorotary. Therefore, the first data may be displayed with dextrorotary, and the second data may be displayed with levorotary.

Because the first data and the second data have different optical rotational characteristics, the first data may be seen by using a viewing device to support dextrorotary, and the second data may be seen by using a viewing device to support levorotary. Without the viewing device, one may only see a mixed image of the first data and the second data. In addition, the optical rotational characteristic of the first and the second display area may be interchanged, and is not only limited to the present configuration.

Figure 3:
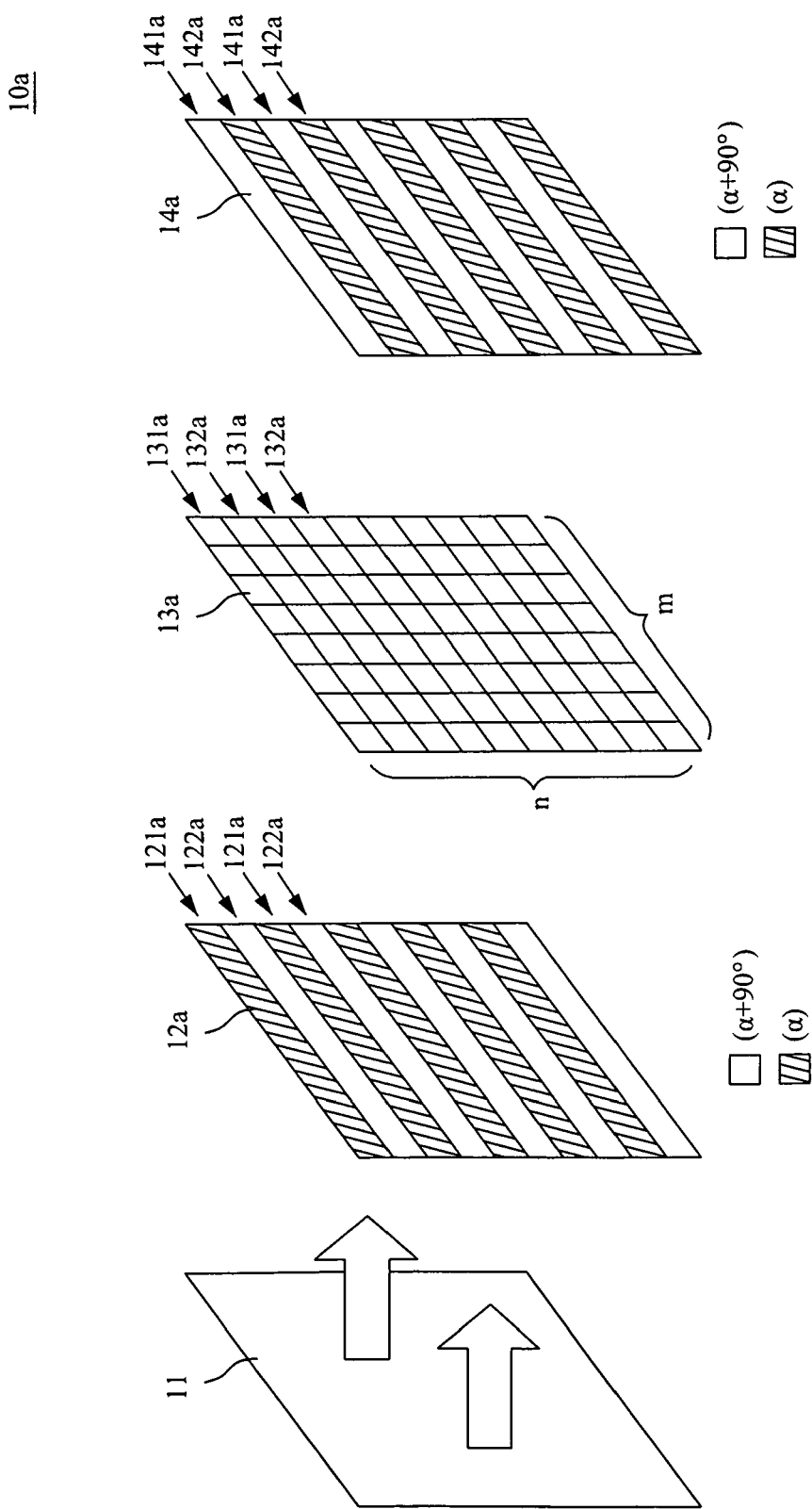
FIG. 3 illustrates a structural diagram of a display module of the electronic device in a second embodiment of the present invention.

Refer to FIG. 3 for a structural diagram of a display module 10a of the electronic device in a second embodiment of the present invention. This embodiment is a modification of the aforementioned first embodiment, wherein the optical rotation plate is removed, and the corresponding structures of the two polarizers causes the data to be displayed with different optical characteristics. As shown in FIG. 3, the first polarizer 12a of the display module 10a comprises a first region 121a and a second region 122a, and the first region 121a and the second region 122a are used to produce a polarizing effect with different angles. The second polarizer 14a comprises a first corresponding region 141a and a second corresponding region 142a, and the first corresponding region 141a and the second corresponding region 142a are used to produce a polarizing effect with different angles. Wherein the position of the first display area corresponds to the first region 121a and the first corresponding region 141a; the position of the second display area corresponds to the second region 122a and the second corresponding region 142a. In other words, the first region 121a and the first corresponding region 141a correspond to the odd rows of the pixels 131a of the liquid crystal layer 13a, and the second region 122a and the second corresponding region 142a correspond to the even rows of the pixels 132a of the liquid crystal layer 13a.

In this embodiment, the polarization effect of the first region 121a and the second region 122a is substantially deviated by 90 degrees, and the polarization effect of the first corresponding region 141a and the second corresponding region 142a is substantially deviated by 90 degrees. As shown in FIG. 3, assume that the first region 121a of the first polarizer 12a causes the passing light to have a polarizing characteristic of $\alpha$ degrees, then the second region 122a will cause the passing light to have a polarizing characteristic of $\alpha+90$ degrees. The first corresponding region 141a of the second polarizer 14a causes the light to have a polarizing characteristic of $\alpha+90$ degrees, and the second corresponding region 142a causes the passing light to have a polarizing characteristic of $\alpha$ degrees. Therefore, the first data displayed on the first display area has a polarizing characteristic of $\alpha+90$ degrees, and the second data displayed on the second display area has a polarizing characteristic of $\alpha$ degrees. Because the first data and the second data have different polarizing characteristics, the first data may be seen by using a viewing device corresponding to the polarizing characteristic of $\alpha+90$ degrees, and the second data may be seen by using a viewing device corresponding to the polarizing characteristic of $\alpha$ degrees. Without the viewing device, one may only see a mixed image of the first data and the second data. In addition, the polarizing characteristic of the different regions of the polarizer 12a and the polarizer 14a may be interchanged to correspond to the different polarizing effect of different display areas, and should not be limited to the present configuration.

Figure 4:
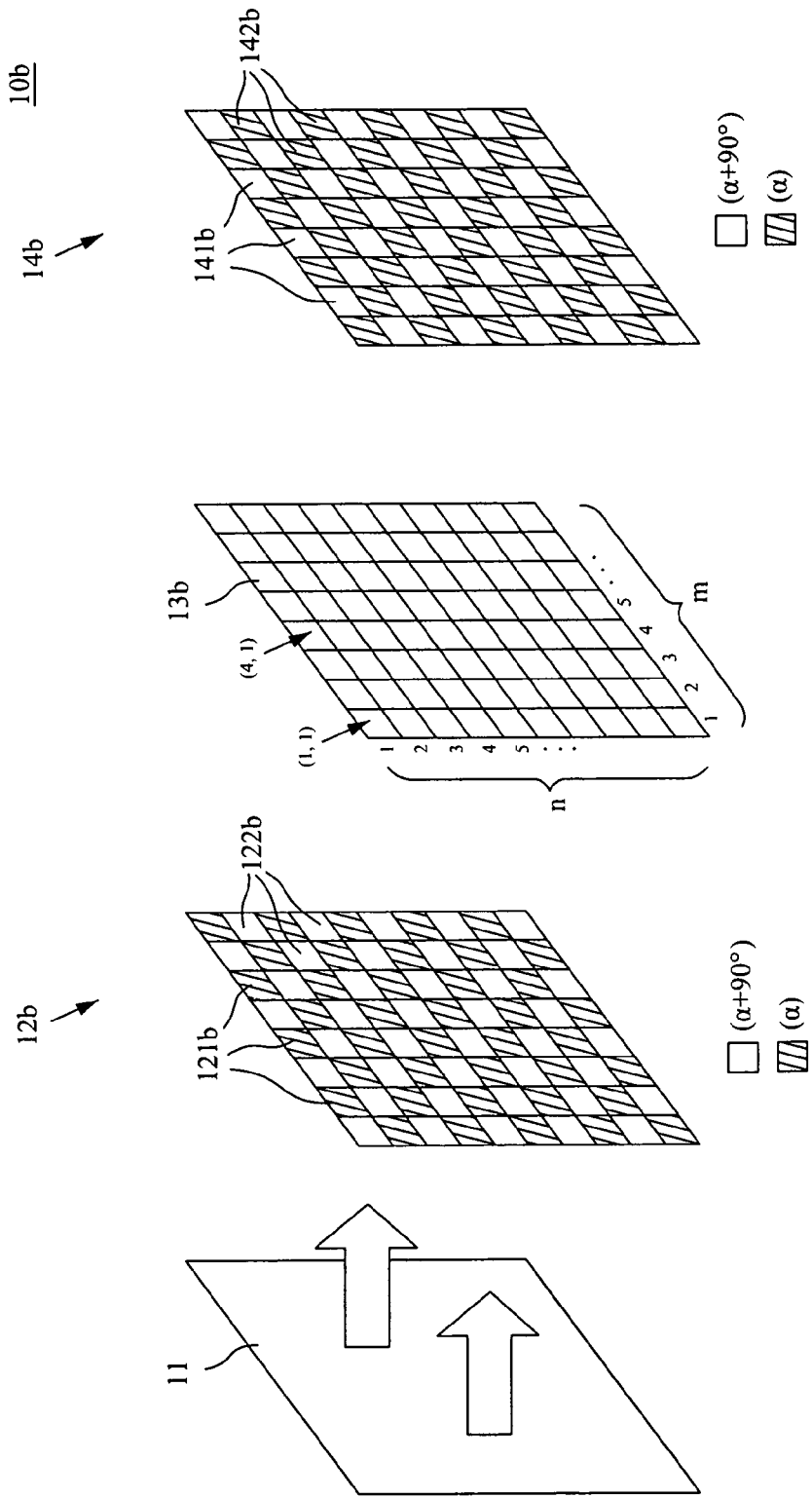
FIG. 4 illustrates a structural diagram of a display module of the electronic device in a third embodiment of the present invention.

Refer to FIG. 4 for a structural diagram of a display module 10b of the electronic device in a third embodiment of the present invention. This embodiment is a modification of the aforementioned second embodiment, whereby the positions of the first display area and the second display area on both polarizers corresponding to the liquid crystal layer are altered, and different data are displayed with different optical characteristics. As shown in FIG. 4, the liquid crystal layer 13b of display module 10b is divided into pixels with (m,n) coordinates, and each pixel is identified using coordinates of (m,n). The pixel corresponds to the first display area when a value (m+n) is an odd number, and the pixel corresponds to the second display area when the value (m+n) is an even number. For example, at pixel coordinates (1,1) of the liquid crystal layer 13b, the value (1+1) is an even number, therefore the pixel corresponds to the second display area; at pixel coordinates (4,1) of the liquid crystal layer 13b, the value (4+1) is an odd number, therefore the pixel corresponds to the first display area. The design of the first polarizer 12b and the second polarizer 14b are also modified accordingly. The position of the first region 121b of the first polarizer 12b and the first corresponding region 141b of the second polarizer 14b correspond to the pixels of the liquid crystal layer 13b which the value (m+n) of the pixel coordinates (m,n) is odd; the position of the second region 122b of the first polarizer 12b and the second corresponding region 142b of the second polarizer 14b correspond to the pixels of liquid crystal layer 13b which the value (m+n) of the pixel coordinates (m,n) is even.

The first polarizer 12b and the second polarizer 14b adopt the same corresponding polarization characteristic as in the second embodiment, therefore the first data displayed on the first display area has a polarizing characteristic of $\alpha+90$ degrees, and the second data displayed on the second display area has a polarizing characteristic of $\alpha$ degrees. The first data and the second data are simultaneously displayed on the same screen by display module 10b. The first data may be seen without any interference by using a viewing device corresponding to the polarizing characteristic of $\alpha+90$ degrees. The second data may be seen by using a viewing device corresponding to the polarizing characteristic of $\alpha$ degrees. As a result, the anti-snooping effect is created to enhance data security. In addition, the position of the pixels on the first display area and the second display area corresponding to the liquid crystal layer 13b may be interchanged, and should not be limited to the present configuration.

In addition, as shown in FIG. 1, the electronic device 1 of the present invention may also produce a second data through the control module 30, and periodically display the first data and the second data on the display module 10 in an alternating manner. This creates a visual time-lag effect. People without the corresponding viewing device may see a mixed image of the first data and the second data on electronic device 1, whereas the user may see the required data with a corresponding viewing device.

Figure 5:
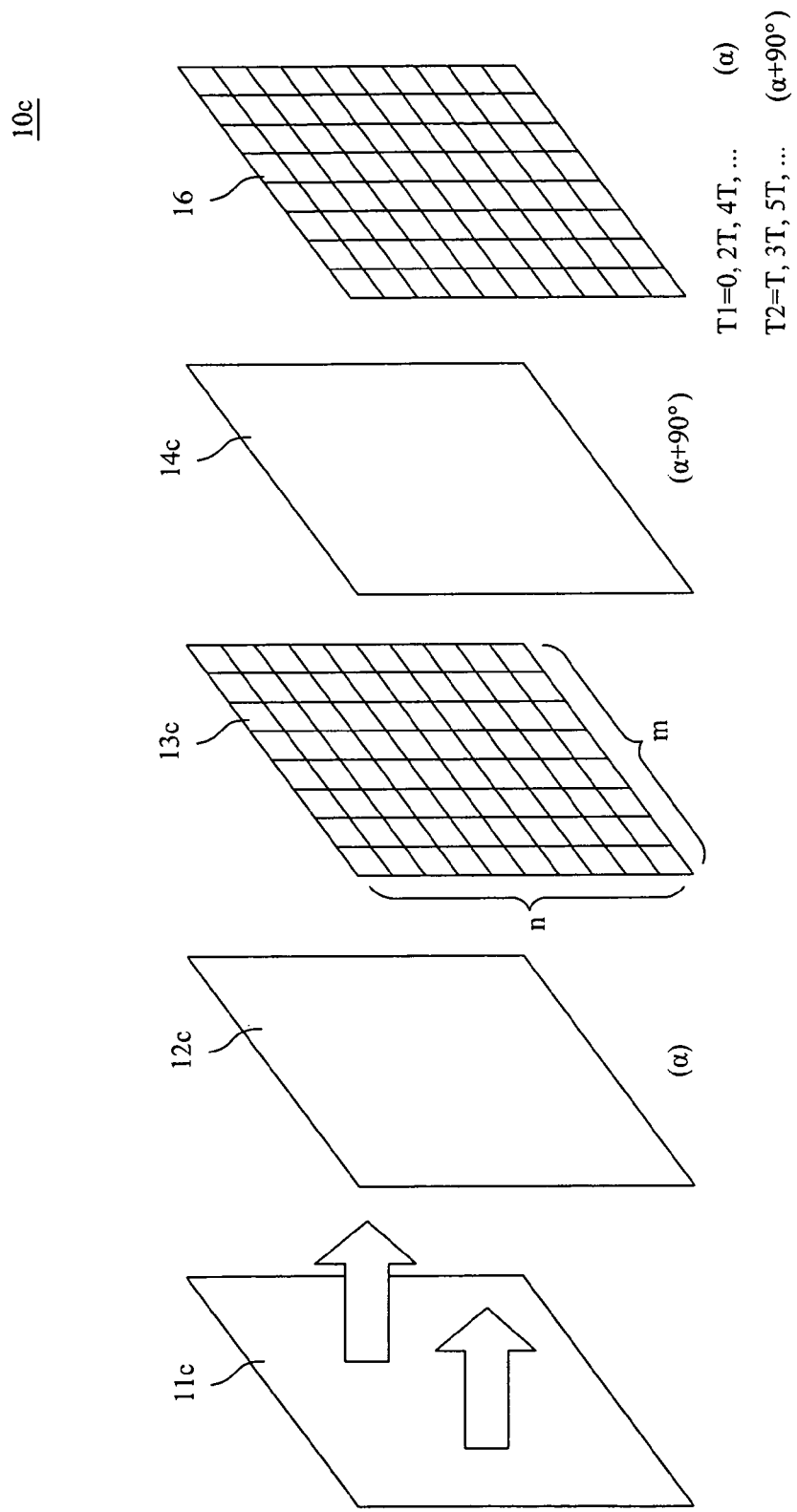
FIG. 5 illustrates a structural diagram of a display module of the electronic device in a fourth embodiment of the present invention.

Please refer to FIG. 1 and FIG. 5 simultaneously. FIG. 5 illustrates a structural diagram of a display module 10c of the electronic device in a fourth embodiment of the present invention. The previous embodiment may degrade the image resolution displayed by the display module; in this embodiment, a time control feature may be incorporated into the design in order to present the original image and achieving an anti-snooping effect at the same time. As shown in FIG. 1 and FIG. 5, the display module 10c comprises a backlight 11c, a first polarizer 12c, a liquid crystal layer 13c, a second polarizer 14c and a liquid crystal control layer 16. The first polarizer 12c, the liquid crystal layer 13c, the second polarizer 14c, and the liquid crystal control layer 16 are sequentially stacked on the backlight 11c. The polarization effect of the second polarizer 14c and the first polarizer 12c is substantially deviated by 90 degrees. The liquid. crystal control layer 16 may create different polarization effects by changing the structure of the liquid crystal via different input voltages. The control module 30 is electrically connected to the storage module 20 and the display module 10c. The control module 30 is used to produce second data, and to periodically display the first data and the second data onto the display module 10c in an alternating manner. While the first data and the second data are displayed, the control module 30 provides the liquid crystal control layer 16 with different voltages so that the first data and the second data have different polarization characteristics.

For example, assuming that the first polarizer 12c causes the passing light to have a polarizing characteristic of $\alpha$ degrees, then the second polarizer 14c may cause the passing light to have a polarizing characteristic of $\alpha+90$ degrees. Assuming that the first data is initially displayed on the display module 10c by the control module 30, after every T period of time, the first data and the second data may be switched over in an alternating manner. Assume that time is represented by nT; if n is 0 or an even number (i.e. time T1=0, 2T, 4T . . . ), the first data is displayed; if n is an odd number (i.e. time T2=T, 3T, 5T . . . ), the second data is displayed. The control module 30 may also provide the liquid crystal control layer 16 with different voltage with respect to time. When n is 0 or a even number, the control module 30 provides voltage to control the liquid crystal control layer 16 to rotate the liquid crystal molecules by 90 degrees. When n is an odd number, the control module 30 may not provide any voltage, such that the liquid crystal molecules may not rotate and remain at 0 degrees. As previously mentioned, after the first data and the second data pass through the second polarizer 14c, the first data may be polarized while passing through liquid crystal control layer 16 (becomes α+180°=α); the second data may bypass the liquid crystal control layer 16, and the data may not be polarized (remaining at α+90°). Therefore the polarization effect of the first data and the second data displayed on the display module 10c is substantially deviated by 90 degrees.

Accordingly, the electronic device of the present invention creates a visual time-lag effect. People without the viewing device may see a mixed image of the first data and the second data on the electronic device, thus the objective of anti-snooping is achieved. The first data may be seen by using a viewing device corresponding to the polarizing characteristic of α degrees, and the second data may be seen by using a viewing device corresponding to the polarizing characteristic of α+90 degrees.

Figure 6:
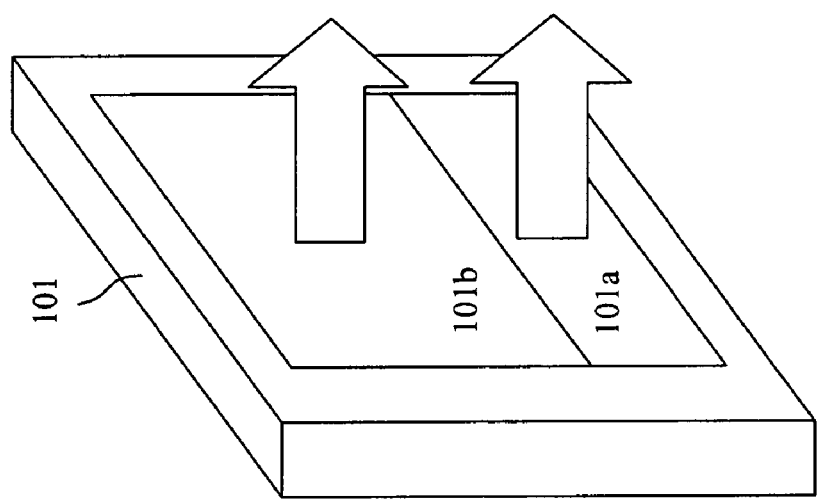
FIG. 6 illustrates a structural diagram of a display module of the electronic device in a fifth embodiment of the present invention.

Refer to FIG. 6 for a structural diagram of a display module 10d of the electronic device in a fifth embodiment of the present invention. This embodiment is not limited to use by a liquid crystal display module. As shown in FIG. 6, the display module 10d comprises a light source unit 101, the light source 101 comprises two light sources which may emit different types of light; the positions of the light sources correspond to the positions of the first display area and the second display area, so that the data on the first display area and the second display area are displayed with different optical characteristics. In this embodiment, the light source corresponding to the first display area is an infrared light source 101a, and the light source corresponding to the second display area is an ordinary light source 101b. In other words, the first data is displayed with an infrared light and the second data is displayed with a visible light. While the first data and the second data are simultaneously displayed on the display module 10d, people without the viewing device may see only the second data. The first data may be seen on the electronic device by a viewing device corresponding to the infrared light property. Hence the objective of anti-snooping is achieved.

Figure 7:
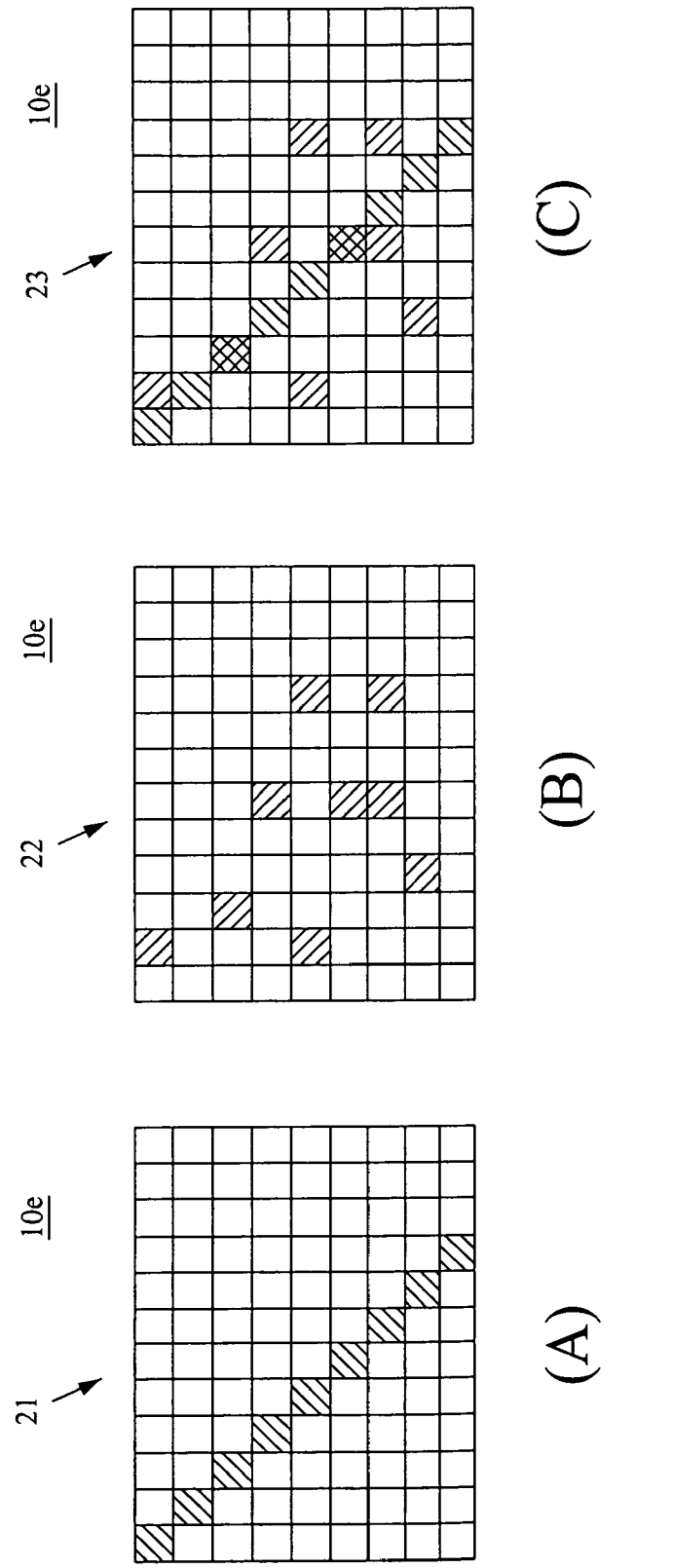
FIG. 7 illustrates a state diagram of using the electronic device in a sixth embodiment of the present invention.

Refer to FIG. 7 for a state diagram of using the electronic device in a the sixth embodiment of the present invention. This embodiment is a modification of the fifth embodiment, and it is not restricted to use with a liquid crystal display module. As shown in FIG. 7, the control module 30 drives the display module 10e to display an image on both the first display area and the second display area; each display area may have a single color, and the color of the first display area and the second display area are different from each other; wherein, the first display area can overlap with the second display area. In other words, the control module 30 is able to display the first data 21 on the display module 10e with a certain single color, and to display second data 22 with another single color to distinguish the two data. In this embodiment, the first data 21 corresponding to the first display area may be displayed with a red color, and the second data 22 corresponding to the second display area may be displayed with a blue color, while the area where the first display area and the second display area overlap may display a color mixture of red and blue. Although the first data 21 and the second data 22 are simultaneously displayed on the display module 10e, people may see a mixed image 23 of the first data 21 and the second data 22, and the objective of anti-snooping is achieved. The first data 21 may be seen by a viewing device which is able to filter out any colors beside red, and the second data 22 may be seen by a viewing device which is able to filter out any colors besides blue.

Figure 8:
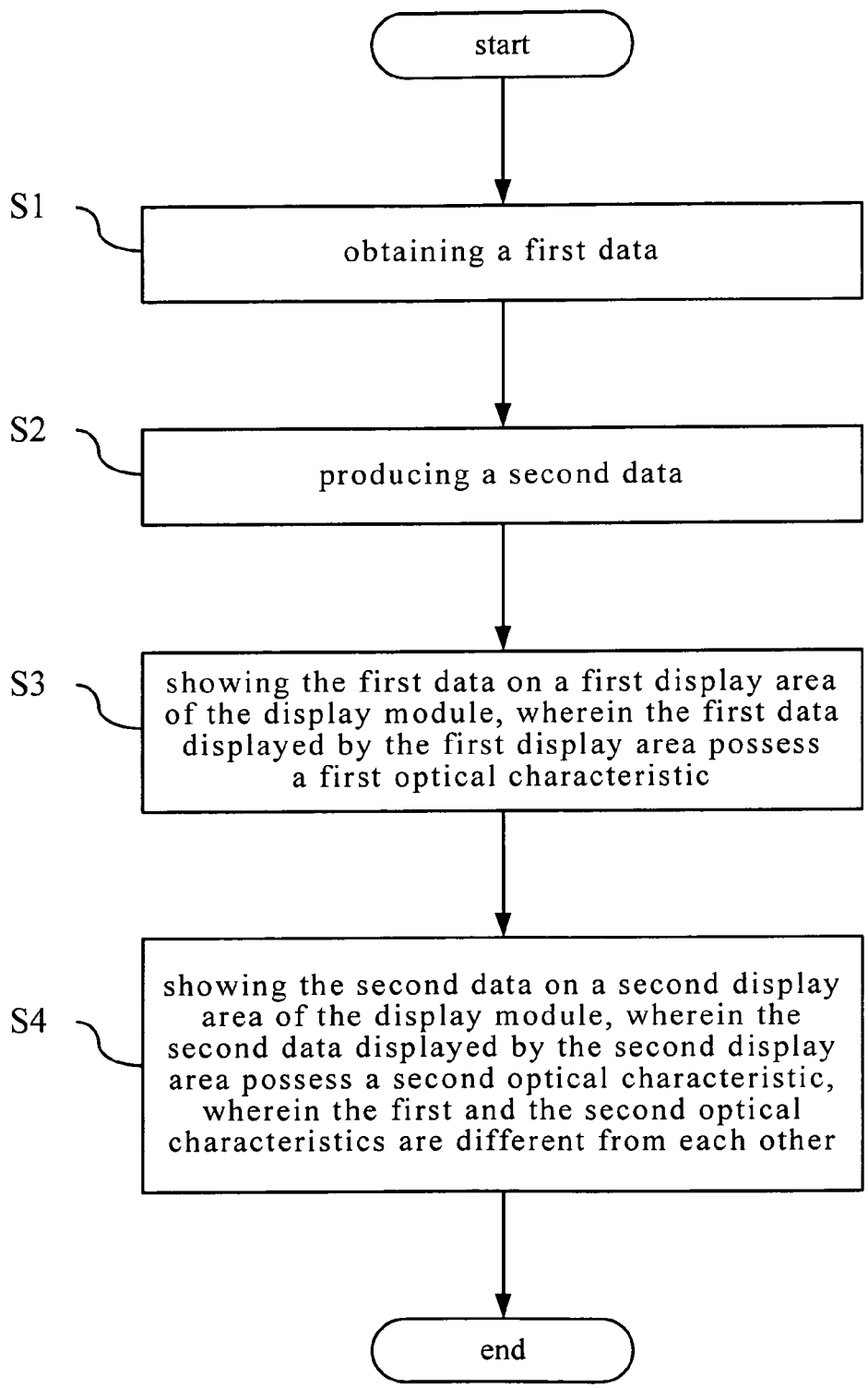
FIG. 8 illustrates a flowchart of a data producing method of the present invention.

Refer to FIG. 8 for a flowchart of a data producing method of the present invention. As shown in FIG. 8, a data producing method of the present invention comprises step S1 to step S3. The following will explain the various steps in detail.

Step S1: Obtaining first data. As shown in FIG. 1, the control module 30 of the electronic device 1 is electrically connected to the storage module 20 and the display module 10. The control module 30 may obtain the first data from the storage module 20 for image processing and then displaying the first data. The first data may either be text data or image data.

Step S2: Producing second data. As shown in FIG. 1, the control module 30 may produce second data. The second data may be different from the aforementioned first data, it may be text data, image data or interference data, wherein the interference data is used to interfere with the viewing of the first data.

Step S3: Displaying the first data on a first display area of the display module, wherein the first data displayed on the first display area has a first optical characteristic. The display module 10 is formed by a first display area and a second display area. The structural design of the display module 10 causes the first display area and the second display area to have different optical structures, therefore the data which pass through the first display area and the second display area have different optical characteristics. After the control module 30 obtains the first data, the first data may be executed an image processing and be displayed in the first display area of the display module 10. Therefore the first data which pass through the first display area has a first optical characteristic. The first optical characteristics may be of a polarizing effect with a specific angle, an optical rotational characteristic in a specific direction, or color or type of light source.

Step S4: Displaying the second data on a second display area of the display module, wherein the second data displayed on the second display area has a second optical characteristic, and the first optical characteristic is different from the second optical characteristic. After the control module 30 produces the second data, the second data may be executed an image processing and be displayed in a second display area of the display module 10. Therefore the second data which pass through the second display area have a second optical characteristic. Both the first data and the second data are simultaneously displayed on the displaying module 10. The second optical characteristic may be different from the first optical characteristic in terms of the angle of the polarizing effect, the direction of the optical rotation, or color or type of light source.

Figure 9:
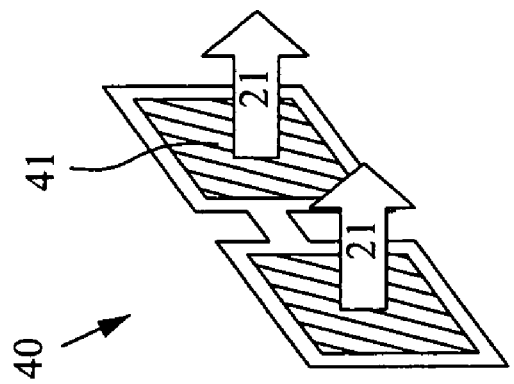
FIG. 9 illustrates an operating diagram of a viewing device for viewing the electronic device in the first embodiment of the present invention.
Figure 9:
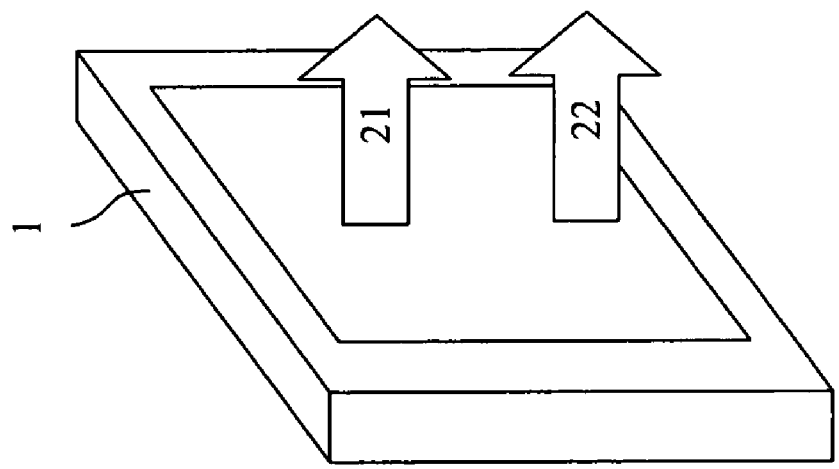

Furthermore, FIG. 9 for an operating diagram of a viewing device 40 for viewing the electronic device 1 in the first embodiment of the present invention. As shown in FIG. 9, the viewing device 40 of the present invention may be used to view the aforementioned electronic device 1; the electronic device 1 should be used in conjunction with the viewing device 40 to facilitate the viewing process of the aforementioned electronic device 1. The viewing device 40 of the present invention comprises a lens module 41. The lens module 41 comprises an optical structure which corresponds to the optical characteristic of the first display area of the electronic device 1. The lens module 41 allows the first data 21 to pass through, but it blocks off the second data 22, so that users may clearly see the first data 21 by wearing the viewing device 40 and may not be distracted by the second data 22.

For example, for the electronic device 1 in the first embodiment, the first data 21 which pass through the first display area has a dextrorotary characteristic. In order to view the content, the lens module 41 of the viewing device 40 also using an optical rotation lens with a dextrorotary characteristic. Therefore, the lens module 41 allows the first data 21 to pass through, but it blocks off the second data 22 which has a levorotary characteristic. The users may see the first data 21 by wearing the viewing device 40, and other people without the viewing device 40 may only see a mixed image of the first data 21 and the second data 22. It should be noted that the viewing device 40 of the present invention may also be used for viewing correspondingly the first data 21 in the aforementioned embodiments, but the present invention is not only limited to viewing this information.

Figure 10:
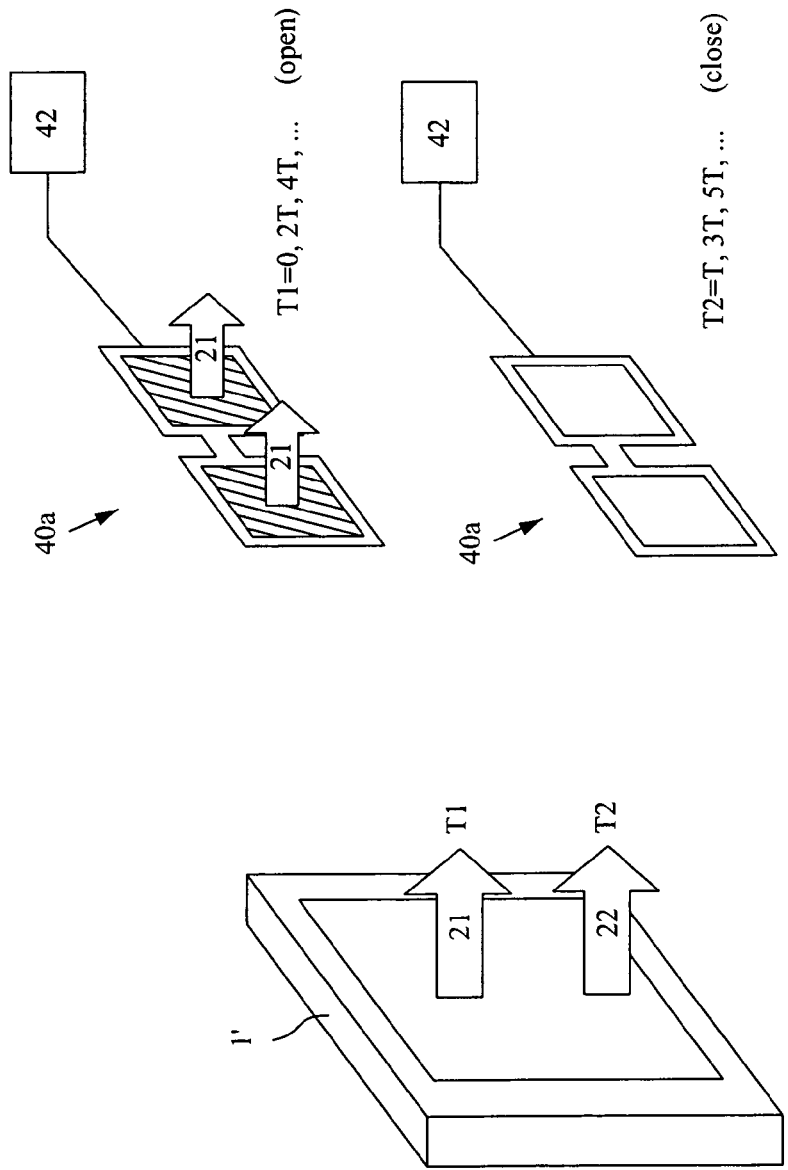
FIG. 10 illustrates an operating diagram of a viewing device in another embodiment of the present invention.

Furthermore, refer to FIG. 10 for an operating diagram of a viewing device in another embodiment of the present invention. As shown in FIG. 10, the viewing device 40a comprises at least one shutter device 42, the shutter device 42 is used to periodically display the first data 21 or the second data 22. For example, by incorporating the displaying method mentioned previously, the first data 21 and the second data 22 may be displayed alternatively on the electronic device 1. Assuming that the electronic device 1 displays the first data 21 at time 0, and then after every period T, the second data 22 and the first data 21 may be displayed in an alternating manner.

Accordingly, the shutter device 42 may either open or close at every interval of time T in order to correspond to the first data 21 or the second data 22. Assuming time is represented by nT, if n is 0 or an even number (i.e. time T1= 0, 2 T, 4 T . . . ), the first data 21 is displayed; at this instant, the shutter device 42 of the viewing device 40a should be opened correspondingly, and the user may see the first data 21 by the viewing device 40a. If n is an odd number (i.e. time T2=T, 3 T, 5 T . . . ), the second data 22 is displayed; at this instant, the shutter device 42 of the viewing device 40a should be closed correspondingly, and the second data 22 is blocked off by the shutter device 42, so the user is prevented from seeing the second data 22. By using the viewing time difference produced by the shutter device 42, the user may choose which data to see without been distracted by the undesirable data. The timing of the opening and closing of the shutter device 42 may be interchanged, and should not be limited to the aforementioned example.

Furthermore, the shutter device 42 may also be applied to the current 3D technology, wherein the electronic device 1 may further produce a first corresponding data (not shown) by the control module 30. The first data and the first corresponding data constitute a same structural image with different visual angles. Similarly, the control module 30 may also produce a second corresponding data (not shown). The first data and the first corresponding data are used for presenting a first 3D data, and it allows a first user to see by a viewing device 40a; the second data and the second corresponding data are used for presenting a second 3D data, and it allows a second user to see by another viewing device 40a. The second 3D data which is viewed by the second user is different from the first 3D data. Assume that time is represented by nT, and n takes on the values of 0, 1, 2, 3, the shutter device 42 of the viewing device 40a may be opened correspondingly to display the first data, the first corresponding data, the second data and the second corresponding data. At n=0 and 2, the first user may see the first data and the first corresponding data; and at n=1 and 3, the second user may see the second data and the second corresponding data. Therefore, the aforementioned data may be periodically displayed on the display module 10 in an alternating manner.

Similarly, the design may produce only the first corresponding data. The first user may see 3D data, and the second user may only see 2D data. In order to increase the application of the electronic device, a number of users may simultaneously see the electronic device 1 by each viewing device 40a, and they may see 2D or 3D data respectively.

Although the present invention has been explained in relation to its preferred embodiment, it is also of vital importance to acknowledge that many other possible modifications and variations can be made without departing from the spirit and scope of the invention as hereinafter claimed.

What is claimed is:
1. An electronic device comprising:
a storage module for storing first data;
a display module for forming a first display area and a second display area, wherein the data displayed on the first display area and the second display area have different optical characteristics; the display module comprising:
a first polarizer comprising a first region and a second region, wherein the first region and the second region are used to produce polarizing effects with different angles;
a second polarizer comprising a first corresponding region and a second corresponding region, wherein the first corresponding region and the second corresponding region are used to produce polarizing effects with different angles; the position of the first display area corresponds to the first region and to the first corresponding region; the position of the second display area corresponds to the second region and to the second corresponding region; the polarizing effects of the second polarizer and the first polarizer are substantially deviated by 90 degrees; and
a liquid crystal layer disposed between the first polarizer and the second polarizer, the liquid crystal layer comprising m×n pixels consisting of m columns and n rows of pixels, and the pixels being divided into two pixel regions to correspond with the first display area and the second display area respectively; and
a control module for producing second data electrically connecting to the storage module and the display module, the control module drives the first display area to display the first data and drives the second display area to display the second data, wherein the first data and the second data are simultaneously displayed by the display module.

2. The electronic device as claimed in claim 1, wherein the row of pixels corresponds to the first display area when n is an odd number, and the row of pixels corresponds to the second display area when n is an even number.

3. The electronic device as claimed in claim 1, wherein each pixel is identified using coordinates of (m,n); the pixel corresponds to the first display area when a value m+n is an odd number, and the pixel corresponds to the second display area when the value m+n is an even number.

4. The electronic device as claimed in claim 1, wherein the polarization effect of the first region and the second region are substantially deviated by 90 degrees; the polarization effect of the first corresponding region and the second corresponding region are substantially deviated by 90 degrees. The electronic device as claimed in claim 1, wherein the display module comprises an optical rotation plate, regions of the optical rotation plate respectively corresponding to the first display area and the second display area form optical rotation structures with different optical rotation characteristics.

5. The electronic device as claimed in claim 1, wherein the display module comprises an optical rotation plate, regions of the optical rotation plate respectively corresponding to the first display area and the second display area form optical rotation structures with different optical rotation characteristics.

6. The electronic device as claimed in claim 5, wherein the optical rotation characteristic is dextrorotary or levorotary.

7. An electronic device comprising:
a storage module for storing first data;
a display module comprising:
a first polarizer;
a second polarizer, the polarization effect of the second polarizer and the first polarizer being substantially deviated by 90 degrees;
a liquid crystal layer disposed between the first polarizer and the second polarizer;
and
a liquid crystal control layer mounted on the second polarizer, wherein the liquid crystal control layer may create different polarization effects by changing the structure of the liquid crystal via different input voltages; and
a control module for producing second data being electrically connected to the storage module and the display module; the control module periodically displays the first data and the second data on the display module in an alternating manner, and provides the liquid crystal control layer with different input voltages according to the first data and the second data.

8. The electronic device as claimed in claim 7, wherein the polarizing angle of the first data and the second data is substantially deviated by 90 degrees.

9. A viewing device which is used for the electronic device according to claim 1, the viewing device comprises a lens module, the lens module comprises an optical structure which corresponds to the optical characteristic produced by the first display area, so as to allow the first data to pass through the lens module and block off the second data.

10. At least one viewing device which is used for the electronic device according to claim 7, wherein the control module further produces first corresponding data; the at least one viewing device comprises at least one shutter device for periodically displaying the first data, the first corresponding data or the second data, wherein the first data and the first corresponding data are used for presenting 3D data.

* * * * *